US012313894B2

(12) United States Patent
Sato et al.

(10) Patent No.: US 12,313,894 B2
(45) Date of Patent: May 27, 2025

(54) OPTICAL FIBER CABLE AND OPTICAL FIBER UNIT

(71) Applicant: SUMITOMO ELECTRIC INDUSTRIES, LTD., Osaka (JP)

(72) Inventors: Fumiaki Sato, Osaka (JP); Yohei Suzuki, Osaka (JP); Yuuki Shimoda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 143 days.

(21) Appl. No.: 18/003,400

(22) PCT Filed: Oct. 29, 2021

(86) PCT No.: PCT/JP2021/039970
§ 371 (c)(1),
(2) Date: Dec. 27, 2022

(87) PCT Pub. No.: WO2022/092251
PCT Pub. Date: May 5, 2022

(65) Prior Publication Data
US 2023/0251445 A1 Aug. 10, 2023

(30) Foreign Application Priority Data
Oct. 30, 2020 (JP) .................................. 2020-182420

(51) Int. Cl.
*G02B 6/44* (2006.01)
(52) U.S. Cl.
CPC ....... *G02B 6/44384* (2023.05); *G02B 6/4403* (2013.01)

(58) Field of Classification Search
CPC .......................... G02B 6/44384; G02B 6/4403
See application file for complete search history.

(56) References Cited

U.S. PATENT DOCUMENTS 6,229,944 B1  5/2001  Yokokawa
7,936,957 B1 *  5/2011  Puzan ................. G02B 6/4494
                                                       385/112
(Continued)

FOREIGN PATENT DOCUMENTS

JP     H11-183764 A   7/1999
JP     2001-194567 A  7/2001
(Continued)

OTHER PUBLICATIONS

International Search Report dated Jan. 18, 2022 issued in Patent Application No. PCT/JP2021/039970.
(Continued)

*Primary Examiner* — Sung H Pak
*Assistant Examiner* — Hoang Q Tran
(74) *Attorney, Agent, or Firm* — McDonald Hopkins LLC

(57) ABSTRACT

An optical fiber cable includes a plurality of optical fibers, a plurality of water-absorbent fibers, and a sheath covering a periphery of the plurality of optical fibers and the plurality of water-absorbent fibers. A ratio of areas of the water-absorbent fibers to an area of an accommodating portion in an inner side of the sheath in a cross section orthogonal to a longitudinal direction of the optical fiber cable is 1% or more and 5% or less, and a maximum value of an area of a gap portion surrounded by the optical fibers in the cross section is 1.0 mm² or less.

6 Claims, 5 Drawing Sheets

(56) References Cited

U.S. PATENT DOCUMENTS

| | | | |
|---|---|---|---|
| 2015/0370026 A1 | 12/2015 | Hudson, II | |
| 2017/0115451 A1* | 4/2017 | Sajima | G02B 6/4432 |
| 2019/0391353 A1 | 12/2019 | Kaji et al. | |
| 2020/0041739 A1* | 2/2020 | Sato | G02B 6/02395 |
| 2020/0073068 A1 | 3/2020 | Shimizu et al. | |
| 2021/0271042 A1 | 9/2021 | Sato et al. | |

FOREIGN PATENT DOCUMENTS

| | | |
|---|---|---|
| JP | 2002-236241 A | 8/2002 |
| JP | 2006-337581 A | 12/2006 |
| JP | 2012-508395 A | 4/2012 |
| JP | 2013-088542 A | 5/2013 |
| JP | 2015-102576 A | 6/2015 |
| JP | 2016-075815 A | 5/2016 |
| JP | 2017-009922 A | 1/2017 |
| JP | 2018-136376 A | 8/2018 |
| JP | 2018-169431 A | 11/2018 |
| JP | 2020-076915 A | 5/2020 |
| WO | 2010-053356 A2 | 5/2010 |
| WO | 2018-221142 A1 | 12/2018 |

OTHER PUBLICATIONS

Written Opinion dated Jan. 18, 2022 issued in Patent Application No. PCT/JP2021/039970.

* cited by examiner

OPTICAL FIBER CABLE AND OPTICAL FIBER UNIT

TECHNICAL FIELD

The present disclosure relates to an optical fiber cable and an optical fiber unit.

The present application claims priority from Japanese Patent Application No. 2020-182420 filed on Oct. 30, 2020, contents of which are incorporated by reference in its entirety.

BACKGROUND ART

Patent Literature 1 discloses an optical fiber cable including an optical fiber unit assembly in which a plurality of optical fiber units, each of which is obtained by bundling a plurality of optical fibers, are assembled. The optical fiber cable includes an external water stop member provided on an outer periphery of the optical fiber unit assembly and an internal water stop member provided inside the optical fiber unit assembly. The internal water stop member is a water-expandable fiber or string member.

Patent Literature 2 discloses an optical fiber cable including a cable core including a plurality of optical fibers. A first water absorbing tape is wrapped around a part of the optical fibers which are located on an outer peripheral side of the cable core. The first water absorbing tape or a second water absorbing tape are at least partially wrapped around a part of the optical fibers, which are located on a center side of the cable core, in a peripheral direction.

Patent Literature 3 discloses an optical fiber cable including optical fiber units each including an optical fiber or an optical fiber ribbon, and a lid wrapped around an outer periphery of the plurality of optical fiber units. The lid includes a water absorbing material inside. In a case where an inner diameter of the lid is d mm, a porosity inside the lid is S %, and an amount of increase in a thickness of the lid after 10 minutes of water absorption of the water absorbing material is h mm, the following expression is established.

$$1 < [d^2 - (d-2h)^2]/(d^2 \times S/100) < 2$$

CITATION LIST

Patent Literature

Patent Literature 1: JP2013-88542A
Patent Literature 2: JP2015-102576A
Patent Literature 3: JP2018-169431A

SUMMARY OF INVENTION

Solution to Problem

An optical fiber cable of the present disclosure includes:
a plurality of optical fibers;
a plurality of water-absorbent fibers; and
a sheath covering a periphery of the plurality of optical fibers and the plurality of water-absorbent fibers,
a ratio of areas of the water-absorbent fibers to an area of an accommodating portion in an inner side of the sheath in a cross section orthogonal to a longitudinal direction of the optical fiber cable is 1% or more and 5% or less, and
a maximum value of an area of a gap portion surrounded by the optical fibers in the cross section is 1.0 mm² or less.

An optical fiber unit according to the present disclosure includes:
a plurality of optical fibers;
a plurality of water-absorbent fibers; and
a coating portion covering a periphery of the plurality of optical fibers and the plurality of water-absorbent fibers,
a ratio of areas of the water-absorbent fibers to an area of an accommodating portion in an inner side of the coating portion in a cross section orthogonal to a longitudinal direction of the optical fiber unit is 1% or more and 5% or less, and
a maximum value of an area of a gap portion surrounded by the optical fibers in the cross section is 1.0 mm² or less.

DESCRIPTION OF EMBODIMENTS

Technical Problem

Figure 1:
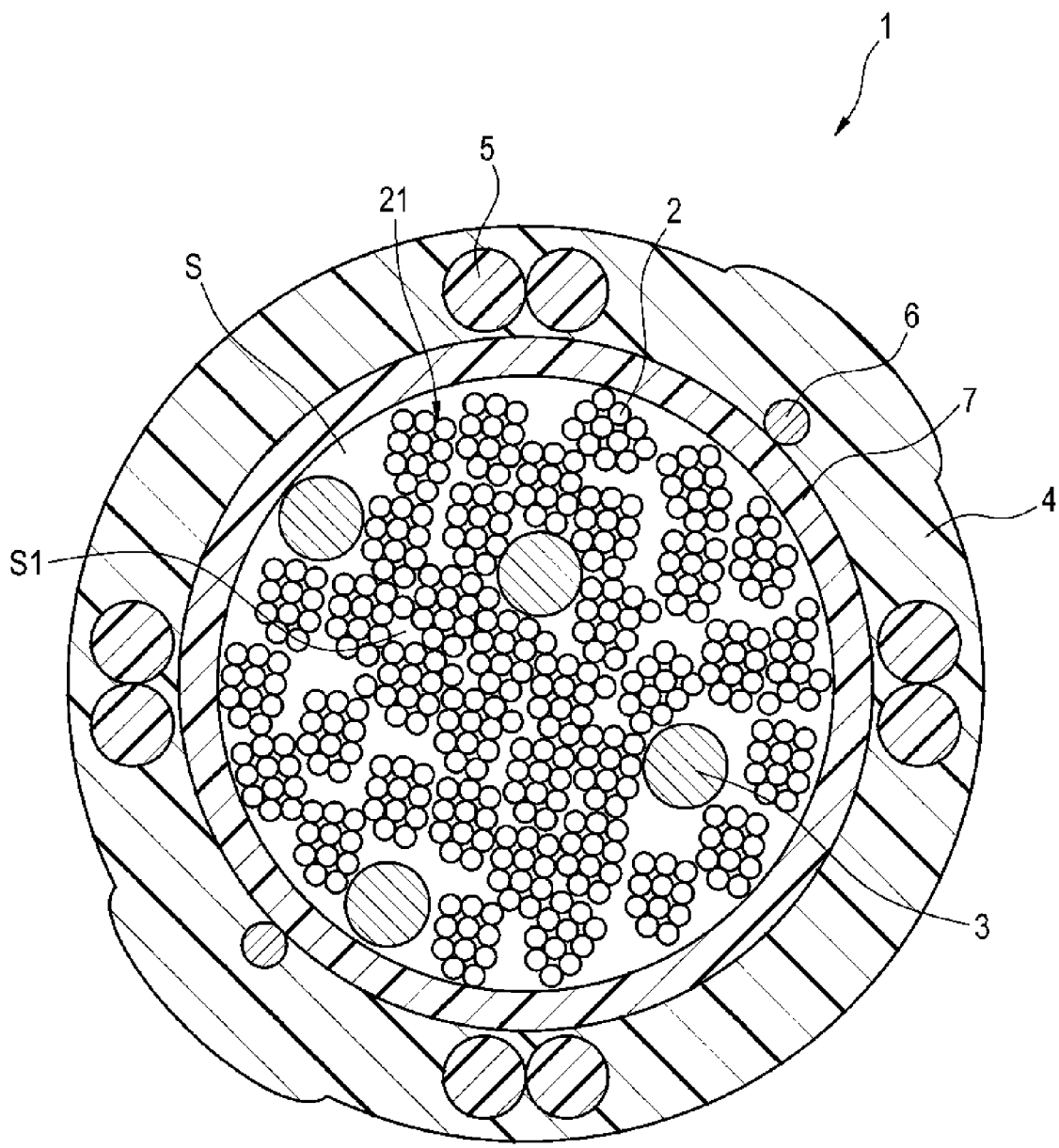
FIG. 1 is a view showing a cross section orthogonal to a longitudinal direction of an optical fiber cable according to an embodiment.

The present disclosure is to provide an optical fiber cable and an optical fiber unit in which optical fibers may be mounted at a high density and which have a waterproof property.

Advantageous Effects of Invention

According to the present disclosure, an optical fiber cable and an optical fiber unit in which optical fibers may be mounted at a high density and which have a waterproof property may be provided.

Description of Embodiments of Present Disclosure

First, embodiments of the present disclosure will be listed and described.

(1) An optical fiber cable according to the present disclosure includes:
a plurality of optical fibers;
a plurality of water-absorbent fibers; and
a sheath covering a periphery of the plurality of optical fibers and the plurality of water-absorbent fibers,
a ratio of areas of the water-absorbent fibers to an area of an accommodating portion in an inner side of the sheath in a cross section orthogonal to a longitudinal direction of the optical fiber cable is 1% or more and 5% or less, and a maximum value of an area of a gap portion surrounded by the optical fibers in the cross section is 1.0 mm² or less.

According to such a configuration, an optical fiber cable in which the optical fibers is mountable at a high density and which has a waterproof property is provided.

(2) An internal porosity obtained by dividing an internal gap area, which is obtained by subtracting areas of the plurality of optical fibers in the cross section from the area of the accommodating portion in the inner side of the sheath in the cross section, by the area of the accommodating portion may be 30% or more and 50% or less.

In a case where the internal porosity is lower than 30%, the density of the optical fibers in the optical fiber cable is too high, and the bending characteristics deteriorate. On the other hand, in a case where the internal porosity is higher than 50%, the waterproof property deteriorates. In a case where the internal porosity is 30% or more and 50% or less, good bending characteristics is obtained while the optical fibers are mounted at a high density and the waterproof property is improved.

(3) Each of the optical fibers may have an outer diameter of 220 μm or less.

According to such a configuration, the area of the gap portion surrounded by the optical fibers is reduced by using the small-diameter optical fibers.

(4) Each of the water-absorbent fibers may have a fineness of 5000 d (denier) or less.

According to such a configuration, since the small-diameter water-absorbent fibers may be disposed even in small gaps, the water-absorbent fibers may be disposed over a wide range in the accommodating portion in the inner side of the sheath.

(5) The optical fiber cable may further include:

a lid covering a periphery of the plurality of optical fibers and the plurality of water-absorbent fibers, the lid is disposed between the sheath and the plurality of optical fibers and between the sheath and the plurality of water-absorbent fibers, and the lid may have a water absorption property.

According to such a configuration, it is possible to prevent water from entering the accommodating portion in the inner side of the sheath.

(6) The optical fiber cable may further include:

a first lid covering a periphery of a part of the plurality of optical fibers; and a second lid covering a periphery of the other part of the plurality of optical fibers which are arranged outside the first lid, and the first lid and the second lid may both have a water absorption property.

According to such a configuration, it is possible to prevent water from entering inside the second lid. Even when water enters inside the second lid, it is possible to prevent the water from entering inside first lid by the first lid. Accordingly, water running in the accommodating portion inside the sheath may be prevented. Further, since a distance between the optical fibers and the first lid and a distance between the optical fibers and the second lid are short, water-absorbent powders of the first lid and the second lid may spread to a periphery of the optical fiber ribbons. Further, the optical fibers disposed inside the first lid and the optical fibers disposed outside the first lid may be distinguished.

(7) An optical fiber unit according to the present disclosure includes:

a plurality of optical fibers;

a plurality of water-absorbent fibers; and a coating portion covering a periphery of the plurality of optical fibers and the plurality of water-absorbent fibers, a ratio of areas of the water-absorbent fibers to an area of an accommodating portion in an inner side of the coating portion in a cross section orthogonal to a longitudinal direction of the optical fiber unit is 1% or more and 5% or less, and a maximum value of an area of a gap portion surrounded by the optical fibers in the cross section is 1.0 mm² or less.

According to such a configuration, an optical fiber unit in which the optical fibers may be mounted at a high density and which has a waterproof property may be provided.

Details of Embodiments of Present Disclosure

Specific examples of an optical fiber cable and an optical fiber unit of the present disclosure will be described with reference to the drawings. The present disclosure is not limited to these examples, is indicated by the claims, and is intended to include all modifications within the scope and meaning equivalent to the claims.

First Embodiment

A configuration of an optical fiber cable 1 according to a first embodiment will be described with reference to FIG. 1.

As shown in FIG. 1, the optical fiber cable 1 includes a plurality of optical fibers 2, a plurality of water-absorbent fibers 3, and a sheath 4. The plurality of optical fibers 2 and the plurality of water-absorbent fibers 3 are disposed in an accommodating portion S inside the sheath 4.

The optical fibers 2 form an optical fiber ribbon 21. In the present example, in the optical fiber cable 1, 36 optical fiber ribbons 21 each of which is formed of 12 optical fibers 2 are twisted together. A plurality of optical fiber ribbons 21 may be twisted together to form an assembly, and a plurality of assemblies may be further twisted together. In this case, a bundling member may be wound around the assembly of the optical fiber ribbons 21.

Figure 2:
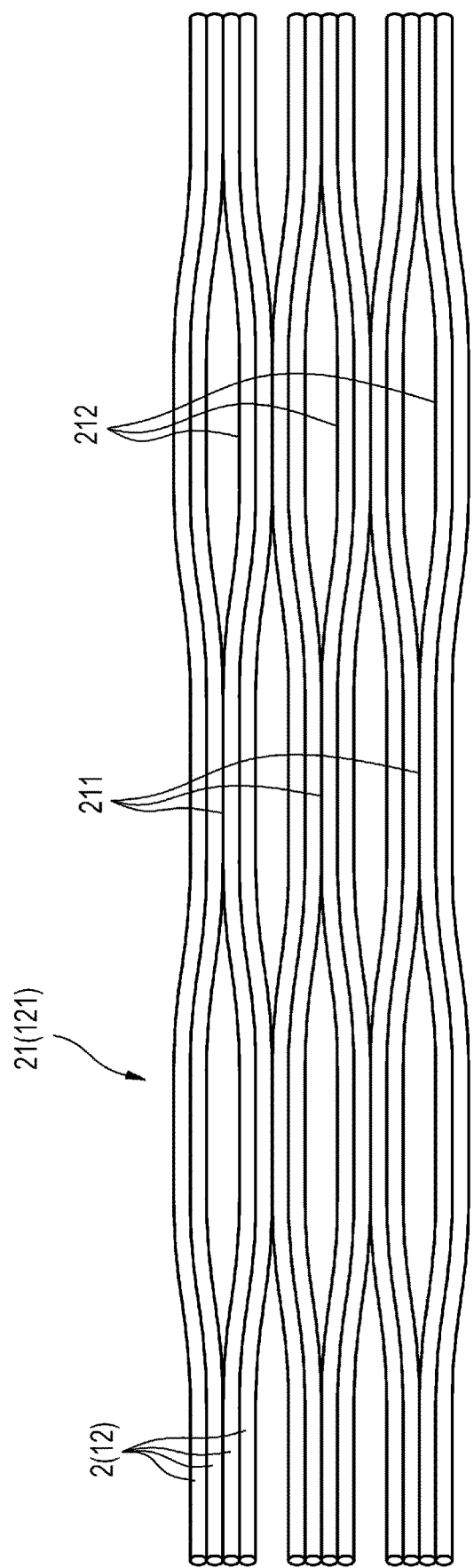
FIG. 2 is a partially developed view showing an optical fiber ribbon, which is used in the optical fiber cable, in the longitudinal direction.

As shown in FIG. 2, the optical fiber ribbon 21 has a configuration in which a plurality of optical fibers 2 are arranged in parallel in a direction orthogonal to a longitudinal direction of the optical fibers 2, and a part of the adjacent optical fibers 2 are connected to each other to form a connected portion 211. The connected portion 211 is intermittently formed along the optical fibers 2, and the connected portion 211 and a non-connected portion 212 are alternately formed along the optical fibers 2. The optical fiber 2 is formed of, for example, a glass fiber including a core and a cladding; and one or a plurality of coatings covering a periphery of the glass fiber. The optical fiber 2 has an outer diameter of, for example, 220 μm or less.

The water-absorbent fiber 3 includes, for example, water-absorbent yarn made of polyester fibers or the like. For example, a polyester fiber having a water absorption speed of 30 g/min or less in tap water is used.

The sheath 4 covers a periphery of the plurality of optical fibers 2 and the plurality of water-absorbent fibers 3. The sheath 4 is made of, for example, a hard resin having a relatively high Young's modulus, such as high-density polyethylene. A plurality of tension members 5 and a plurality of tearing strings 6 may be embedded in the sheath 4. The tension member 5 may be made of, for example, a fiber-reinforced plastic (FRP) such as an aramid FRP, a glass FRP, or a carbon FRP, or may be made of a metal wire.

Inside the optical fiber cable 1, the water-absorbent fibers 3 are disposed such that a ratio of cross-sectional areas of the water-absorbent fibers 3 to a cross-sectional area of the accommodating portion S in an inner side of the sheath 4 is 1% or more and 5% or less.

Inside the optical fiber cable 1, the optical fiber ribbons 21 are disposed such that a maximum value of a cross-sectional area of a gap portion S1 surrounded by the optical fiber ribbons 21 is 1.0 mm$^2$ or less. The cross-sectional area is an area in a cross section orthogonal to the longitudinal direction of the optical fiber cable 1.

Here, it is known that transmission characteristics of the optical fibers 2 may deteriorate due to moisture. That is, in the optical fiber cable 1, in a case where water enters the accommodating portion S in the inner side of the sheath 4 due to damage of the sheath 4, penetration of moisture, or the like, the transmission characteristics of the optical fibers 2 may deteriorate. In addition, in a case where water enters gaps and so on around the optical fiber ribbons 21, the water may enter over a wide range in the cable longitudinal direction because the water may move through the gaps. Such transmission of water inside the accommodating portion S of the optical fiber cable 1 is referred to as water running.

According to the Lucas-Washburn equation, a penetration depth of a liquid is proportional to root of a capillary radius (½ power). That is, as a radius and a cross-sectional area of the gap portion S1 reduce, the penetration depth of the liquid reduces, and the waterproof property is improved.

In the optical fiber cable 1 of the present embodiment, the maximum value of the cross-sectional area of the gap portion S1 is set to 1.0 mm$^2$ or less. By setting the maximum value of the cross-sectional area of the gap portion S1 to 1.0 mm$^2$ or less, particularly, the waterproof property may be improved. That is, occurrence of the water running inside the gap portion S1 may be prevented. In the optical fiber cable 1, the ratio of the cross-sectional areas of the water-absorbent fibers 3 to the cross-sectional area of the accommodating portion S is set to 1% or more and 5% or less. Therefore, the water entering inside the sheath 4 may be absorbed by the water-absorbent fibers 3 accommodated in the accommodating portion S in the inner side of the sheath 4. Accordingly, it is possible to improve the waterproof property while mounting the optical fibers 2 at a high density.

The gap portion S1 surrounded by the optical fiber ribbons 21 may be a gap portion surrounded by one of the optical fiber ribbons 21 or a gap portion surrounded by a plurality of optical fiber ribbons 21, and indicates a space surrounded by a plurality of optical fibers 2 adjacent to each other and in contact with each other without a gap. In both cases, the optical fiber cable 1 is formed such that the maximum value of the cross-sectional area of the gap portion is 1.0 mm$^2$ or less.

In the present embodiment, the optical fiber 2 has an outer diameter of 220 μm or less. With the small-diameter optical fibers 2, in a case where an internal porosity is 30% or more and 50% or less, a maximum value of a cross-sectional area of the gap portion S1 surrounded by the optical fiber ribbons 21 is reduced, and the maximum value of the cross-sectional area of the gap portion may be 1.0 mm$^2$ or less.

The optical fiber cable 1 of the present embodiment may include a lid 7 disposed between the sheath 4 and the plurality of optical fiber ribbons 21 and plurality of water-absorbent fibers 3. The lid 7 covers a periphery of the plurality of optical fiber ribbons 21 and the plurality of water-absorbent fibers 3. The lid 7 is formed of, for example, a non-woven fabric made of polyester or the like. In addition, the lid 7 may have a water absorption property. In a case where the lid 7 has a water absorption property, the lid 7 is formed by, for example, attaching water-absorbent powders to a base cloth made of polyester or the like. The lid 7 may be longitudinally or spirally wrapped around the plurality of optical fiber ribbons 21. The "longitudinally . . . wrapped" means a state in which the lid 7 is wrapped around the optical fiber ribbons 21 such that a longitudinal direction of the lid 7 is parallel to the longitudinal direction of the optical fiber cable 1 and a width direction of the lid 7 is along a peripheral direction of the optical fiber cable 1.

In the case where the lid 7 has a water absorption property as described above, it is possible to prevent water from entering the accommodating portion S in the inner side of the sheath 4, and the waterproof property of the optical fiber cable 1 may be improved.

In addition, the optical fiber cable 1 of the present embodiment may be formed such that the internal porosity obtained by dividing an internal gap area by the cross-sectional area of the accommodating portion S is 30% or more and 50% or less. In the present example, the accommodating portion S is a space closed by the lid 7, and the cross-sectional area of the accommodating portion S is calculated based on an inner diameter of the lid 7. In the optical fiber cable 1 including no lid 7, the accommodating portion S is a space closed by the sheath 4, and the cross-sectional area of the accommodating portion S is calculated based on an inner diameter of the sheath 4. The internal gap area is obtained by subtracting the cross-sectional areas of the plurality of optical fiber ribbons 21 from the cross-sectional area of the accommodating portion S.

Figure 3:
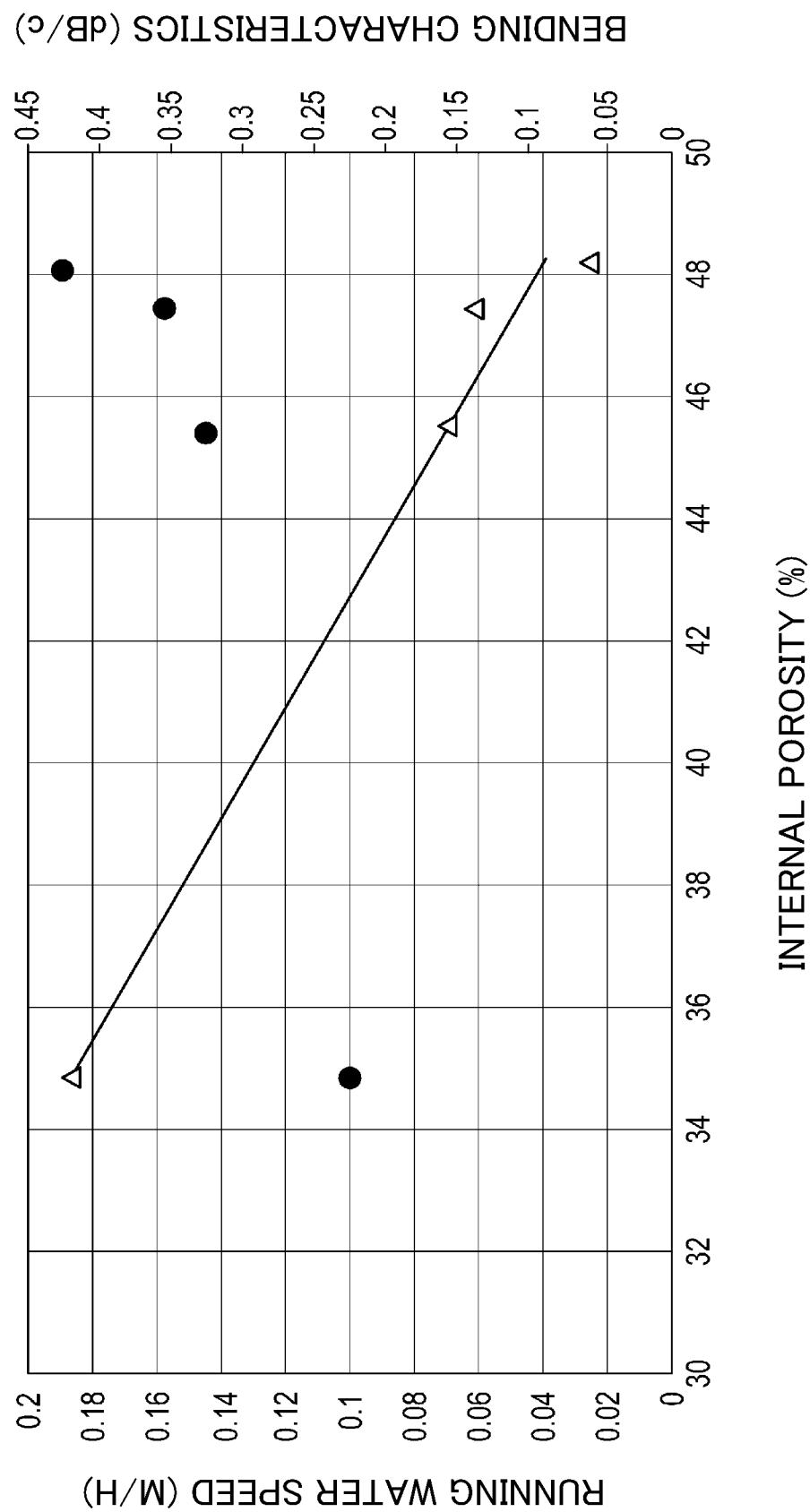
FIG. 3 is a diagram illustrating a relationship between waterproof characteristics and bending characteristics of a cable in which optical fibers are mounted at a high density.

Here, as shown in FIG. 3, it is known that as the number of the optical fibers 2 mounted in the accommodating portion S in the inner side of the sheath 4 increases (that is, the porosity decreases), the waterproof property is improved, but the bending characteristics tends to deteriorate. In FIG. 3, a horizontal axis represents the internal porosity, and a vertical axis represents a running water speed or the bending characteristics. White triangles indicate values of the bending characteristics, and black circles indicate values of the running water speed.

In the optical fiber cable 1 of the present embodiment, since the internal porosity is 30% or more and 50% or less, it is possible to obtain good bending characteristics while improving the waterproof property by mounting the optical fibers 2 at a high density.

In addition, the optical fiber cable 1 of the present embodiment may include water-absorbent fibers 3 having a fineness of 5000 d or less as the water-absorbent fibers 3. Since the small-diameter water-absorbent fibers 3 may also be disposed in a small gaps, the water-absorbent fibers 3 may be disposed over a wide range in the accommodating portion S in the inner side of the sheath 4.

Figure 4:
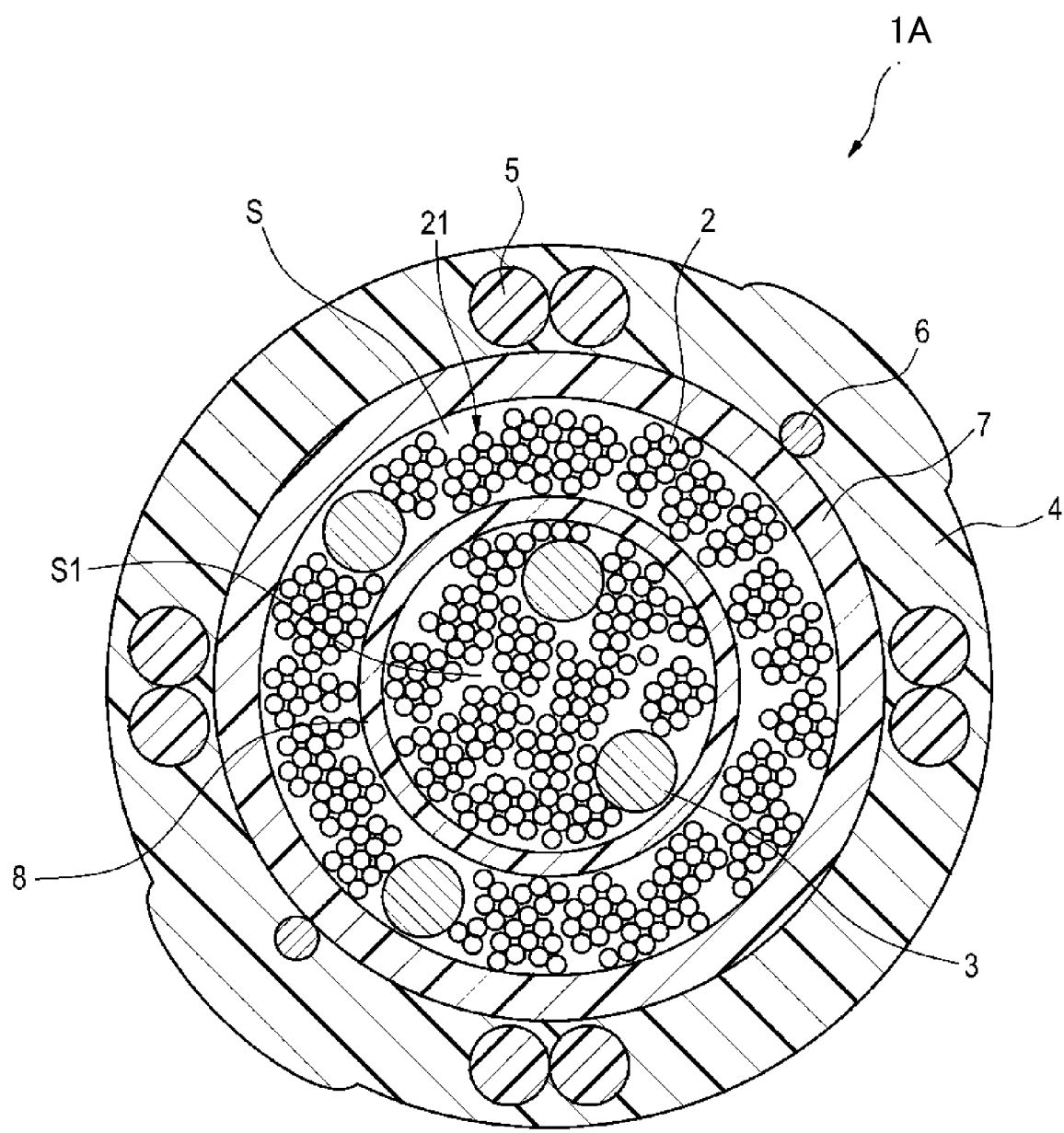
FIG. 4 is a cross-sectional view showing a modification of the optical fiber cable shown in FIG. 1.

As shown in FIG. 4, in addition to the lid 7, the optical fiber cable 1 of the present embodiment may further include a lid 8 in an inner side of the lid 7. The lid 7 is an example of a second lid, and the lid 8 is an example of a first lid.

In an optical fiber cable 1A, the lid 8 covers a periphery of a part of the plurality of optical fiber ribbons 21. The lid 8 is formed of, for example, a non-woven fabric made of polyester or the like. The lid 8 has a water absorption property and the lid 8 may be formed by, for example, attaching water-absorbent powders to a base cloth made of polyester or the like. The lid 8 is longitudinally or spirally wrapped around the plurality of optical fiber ribbons 21. The water-absorbent fibers 3 may be disposed only inside the lid 8, or may be disposed inside and outside the lid 8.

According to such a configuration, the optical fibers 2 disposed inside the lid 8 and the optical fibers 2 disposed outside the lid 8 may be distinguished. In a case where the lid 8 has a water absorption property, even when water enters inside the lid 7, it is possible to prevent the water from entering inside the lid 8. As a result, water running inside the accommodating portion S in the inner side of the sheath 4 may be prevented. Further, since a distance between the optical fibers 2 and the lid 7 and a distance between the optical fibers 2 the lid 8 are short, the water-absorbent powders of the lid 7 and the lid 8 may spread to a periphery of the optical fiber ribbons 21.

Although the present disclosure has been described in detail with reference to a specific embodiment, it is apparent to those skilled in the art that various changes and modifications may be made without departing from the spirit and scope of the present disclosure. The numbers, positions, shapes or the like of components described above are not limited to the above embodiment, and may be changed to suitable numbers, positions, shapes or the like during carrying out the present disclosure.

Figure 5:
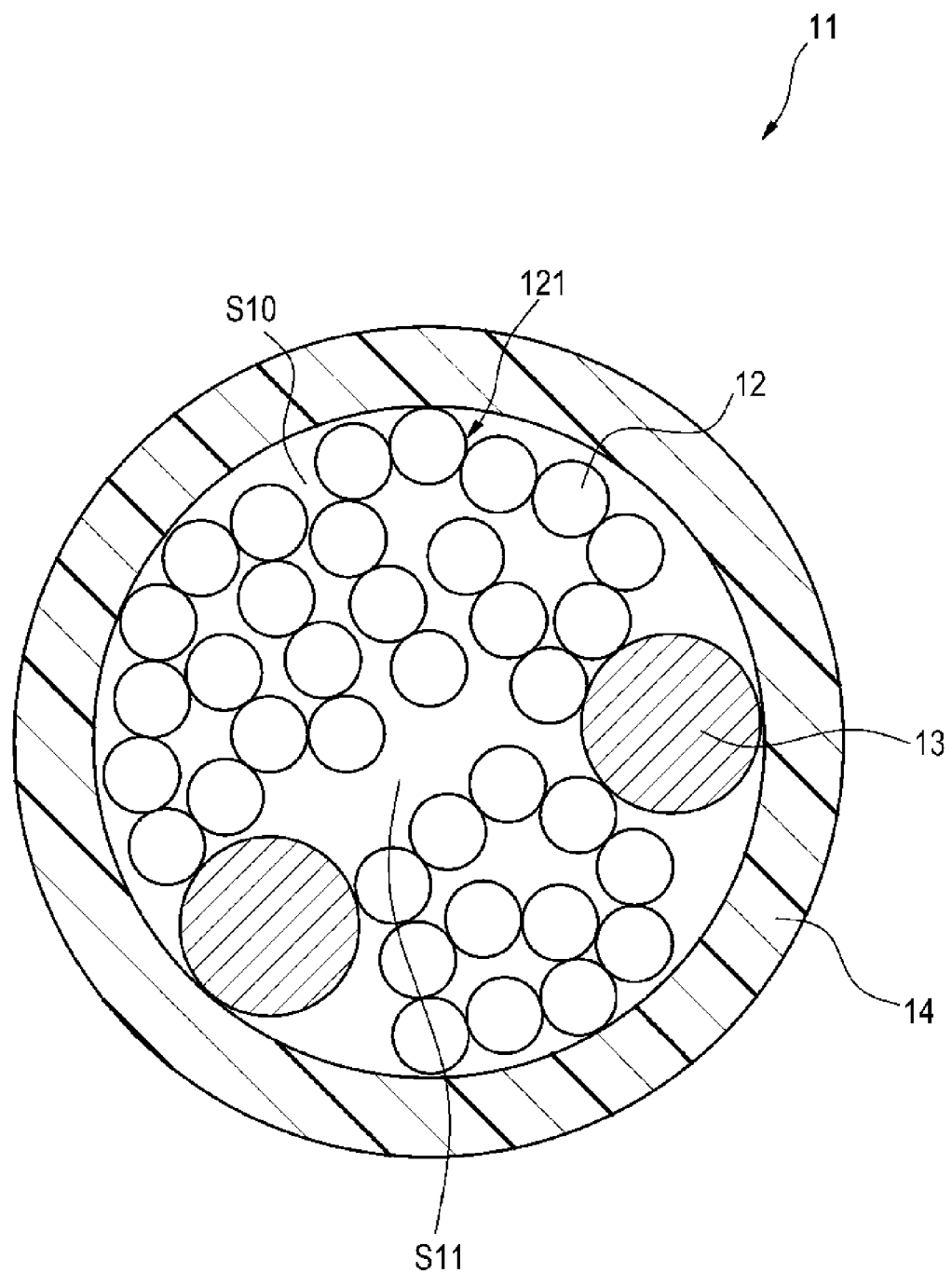
FIG. 5 is a view showing a cross section orthogonal to a longitudinal direction of an optical fiber unit according to an embodiment.

Although the optical fiber cable 1 has been described in the above embodiment, the configuration of the present embodiment may be applied to those other than the optical fiber cable 1. FIG. 5 is a view showing an example of an optical fiber unit 11. The optical fiber unit 11 includes a plurality of optical fibers 12, a plurality of water-absorbent fibers 13, and a coating portion 14. The plurality of optical fibers 12 and the plurality of water-absorbent fibers 13 are disposed in an accommodating portion S10 in the inner side of the coating portion 14.

The optical fibers 12 form an optical fiber ribbon 121. A plurality of optical fiber ribbons 121 are bundled by being twisted together. In the present example, in the optical fiber unit 11, three optical fiber ribbons 21 each of which is formed of 12 optical fibers 12 are twisted together.

The optical fiber ribbon 121 is configured in the same manner as the optical fiber ribbon 21 in FIG. 2. That is, the optical fiber ribbon 121 has a configuration in which a plurality of optical fibers 12 are arranged in parallel in a direction orthogonal to a longitudinal direction of the optical fibers 12, and a part of the adjacent optical fibers 12 are connected to each other to form the connected portion 211. The connected portion 211 is intermittently formed along the optical fibers 12, and the connected portion 211 and the non-connected portion 212 are alternately formed along the optical fibers 12. The optical fiber 12 is formed of, for example, a glass fiber including a core and a cladding; and one or a plurality of coatings covering a periphery of the glass fiber. The optical fiber 12 has an outer diameter of, for example, 220 μm or less.

The water-absorbent fiber 13 includes, for example, water-absorbent yarn made of polyester fibers or the like. As the polyester fiber, for example, a polyester fiber having a water absorption speed of 30 g/min or less in tap water is used.

The coating portion 14 covers a periphery of the plurality of optical fibers 12 and the plurality of water-absorbent fibers 13. The coating portion 14 is made of, for example, a hard resin having a relatively high Young's modulus, such as high-density polyethylene. For example, when a tearing string (not shown) is embedded in the coating portion 14, the coating portion 14 may be formed of a member having low strength and low elongation such that the coating portion 14 may be torn by the tearing string.

Inside the optical fiber unit 11, the water-absorbent fibers 13 are disposed such that a ratio of cross-sectional areas of the water-absorbent fibers 13 to a cross-sectional area of the accommodating portion S10 in the inner side of the coating portion 14 is 1% or more and 5% or less. The optical fiber ribbons 121 are disposed such that a maximum value of a cross-sectional area of a gap portion S11 surrounded by the optical fiber ribbons 121 is 1.0 mm$^2$ or less. The cross-sectional area is an area in a cross section orthogonal to the longitudinal direction of the optical fiber unit 11.

According to such a configuration, by setting the maximum value of the cross-sectional area of the gap portion S11 to 1.0 mm$^2$ or less, particularly, the waterproof property may be improved. That is, occurrence of the water running inside the gap portion S11 may be prevented. Further, the water entering inside the coating portion 14 may be absorbed by the water-absorbent fibers 13 accommodated in the accommodating portion S10 in the inner side of the coating portion 14. Accordingly, it is possible to improve the waterproof property while mounting the optical fibers 2 at a high density.

The optical fiber unit 11 may be mounted in an optical fiber cable.

In the above embodiment, the optical fiber ribbon 21 is formed of 12 optical fibers 2. However, the number of the optical fibers 2 forming the optical fiber ribbon 21 may be changed as appropriate. Similarly, the optical fiber ribbon 121 is formed of 12 optical fibers 12. However, the number of the optical fibers 12 forming the optical fiber ribbon 121 may be changed as appropriate.

In the embodiment described above, the optical fiber cable 1 and the optical fiber unit 11 include the optical fiber ribbon 21 and the optical fiber ribbon 121 as forms of the optical fiber 2 and the optical fiber 12. However, the optical fiber cable 1 may include the optical fiber 2 as a single-core optical fiber instead of the optical fiber ribbon. Similarly, the optical fiber unit 11 may include the optical fiber 12 as a single-core optical fiber instead of the optical fiber ribbon. A plurality of single-core optical fibers may be twisted together to form an assembly, and a bundling member may be wound around the assembly. In this case, the optical fiber cable 1 is formed such that a maximum value of cross-sectional areas of gap portions surrounded by the plurality of optical fibers 2 is 1.0 mm$^2$ or less. Similarly, the optical fiber unit 11 is formed such that a maximum value of cross-sectional areas of gap portions surrounded by the plurality of optical fibers 12 is 1.0 mm$^2$ or less.

(Evaluation Experiment)

For the optical fiber cable 1 according to the present embodiment, samples No. 1 to No. 19 were prepared in which three parameters including the internal porosity, a maximum area of the gap portion, and a ratio of areas of the water-absorbent fibers to the internal gap area (water-absorbent fiber occupancy) were changed. In the optical fiber cable 1, a non-water absorbing non-woven fabric was used as the lid 7. As the maximum area of the gap portion, areas surrounded by the plurality of optical fiber ribbons 21 were calculated based on a cross-sectional image of the optical fiber cable 1. For each sample, the running water speed (m/h) was evaluated by holding the sample in artificial seawater at room temperature for 240 hours and measuring a length of water running during this period. Further, for each sample, a bending test of bending at ±180° at a bending radius 10 times as large as an outer diameter of the cable was performed 10 cycles to evaluate magnitude of loss increase (bending characteristics (dB/c)) at a wavelength of 1.55 μm in the bending test. The following Table 1 shows evaluation results of the waterproof property and the bending characteristics for the samples No. 1 to No. 19.

TABLE 1

| Sample No. | Internal porosity (%) | Maximum area of gap portion (mm$^2$) | water-absorbent fiber occupancy | running water speed (m/h) | evaluation result of running water speed | bending characteristics (dB/c) when R = 10D | evaluation result of bending characteristics |
|---|---|---|---|---|---|---|---|
| 1 | 30 | 0.2 | 0.005 | 0.12 | C | 0.06 | A |
| 2 | 30 | 0.5 | 0.005 | 0.15 | C | 0.06 | A |
| 3 | 30 | 1.0 | 0.005 | 0.23 | C | 0.05 | A |
| 4 | 30 | 0.2 | 0.01 | 0.06 | A | 0.08 | A |
| 5 | 30 | 0.5 | 0.01 | 0.08 | A | 0.09 | A |
| 6 | 30 | 1.0 | 0.01 | 0.1 | B | 0.07 | A |
| 7 | 30 | 0.2 | 0.05 | 0.05 | A | 0.10 | B |
| 8 | 30 | 0.5 | 0.05 | 0.05 | A | 0.10 | B |
| 9 | 30 | 1.0 | 0.05 | 0.08 | A | 0.11 | B |
| 10 | 30 | 1.5 | 0.05 | 0.13 | C | 0.11 | B |
| 11 | 30 | 0.2 | 0.10 | 0.04 | A | 0.15 | C |
| 12 | 30 | 0.5 | 0.10 | 0.04 | A | 0.16 | C |
| 13 | 30 | 1.0 | 0.10 | 0.06 | A | 0.17 | C |
| 14 | 30 | 0.5 | 0.005 | 0.18 | C | 0.00 | A |
| 15 | 50 | 1.0 | 0.005 | 0.25 | C | 0.00 | A |
| 16 | 50 | 0.5 | 0.01 | 0.09 | A | 0.00 | A |
| 17 | 50 | 1.0 | 0.01 | 0.11 | B | 0.01 | A |
| 18 | 50 | 0.5 | 0.05 | 0.07 | A | 0.04 | A |
| 19 | 50 | 1.0 | 0.05 | 0.09 | A | 0.05 | A |

The running water speed of each sample was evaluated based on whether the running water speed is less than 0.12 m/h. When the running water speed was less than 0.12 m/h, the waterproof property was determined as good, when the running water speed was 0.10 m/h or more and less than 0.12 m/h, the waterproof property was evaluated as B, and when the running water speed was less than 0.10 m/h, the waterproof property was evaluated as A. Further, when the running water speed was 0.12 m/h or more, the waterproof property was determined as poor, and evaluated as C. That is, the sample evaluated as A or B is an optical fiber cable having a good waterproof property.

The evaluation of the bending characteristics of each sample was made based on whether the bending characteristics are less than 0.15 dB/c. When the bending characteristics were less than 0.15 dB/c, the bending characteristics were determined as good, when the bending characteristics were 0.10 dB/c or more and less than 0.15 dB/c, the bending characteristics were evaluated as B, and when the bending characteristics were less than 0.10 dB/c, the bending characteristics were evaluated as A. Further, when the bending characteristics were 0.15 dB/c or more, the bending characteristics were determined as inferior and were evaluated as C. That is, the sample evaluated as A or B is an optical fiber cable having good bending characteristics.

According to the evaluation results in Table 1, samples having a good waterproof property and bending characteristics were samples No. 4 to No. 9 and samples No. 16 to No. 19. As a result, it was found that the waterproof property and the bending characteristics were good when the occupancy of the water-absorbent fibers was 1% or more and 5% or less and the maximum area of the gap portion was 1.0 mm$^2$ or less. The same tendency is also exhibited in a case of an optical fiber cable having single-core optical fibers instead of the optical fiber ribbons.

REFERENCE SIGNS LIST 1, 1A: optical fiber cable
2: optical fiber
3: water-absorbent fiber
4: sheath
5: tension member
6: tearing string
7, 8: lid
11: optical fiber unit
12: optical fiber
13: water-absorbent fiber
14: coating portion
21: optical fiber ribbon
121: optical fiber ribbon
211: connected portion
212: non-connected portion
S, S10: accommodating portion
S1, S11: gap portion

What is claimed is:
1. An optical fiber cable comprising:
a plurality of optical fibers;
a plurality of water-absorbent fibers; and
a sheath covering a periphery of the plurality of optical fibers and the plurality of water-absorbent fibers, wherein
a ratio of areas of the water-absorbent fibers to an area of an accommodating portion in an inner side of the sheath in a cross section orthogonal to a longitudinal direction of the optical fiber cable is 1% or more and 5% or less, and
a maximum value of an area of a gap portion surrounded by the optical fibers in the cross section is 1.0 mm$^2$ or less, wherein
an internal porosity obtained by dividing an internal gap area, which is obtained by subtracting areas of the plurality of optical fibers in the cross section from an area of the accommodating portion in the inner side of the sheath in the cross section, by the area of the accommodating portion is 30% or more and 50% or less, and wherein
each of the optical fibers has an outer diameter of 220 μm or less.
2. The optical fiber cable according to claim 1, wherein each of the water-absorbent fibers has a fineness of 5000 d or less.

3. The optical fiber cable according to claim 1, further comprising:
a lid covering a periphery of the plurality of optical fibers and the plurality of water-absorbent fibers, wherein
the lid is disposed between the sheath and the plurality of optical fibers and between the sheath and the plurality of water-absorbent fibers, wherein
the lid has a water absorption property.

4. The optical fiber cable according to claim 1, further comprising:
a first lid covering a periphery of a part of the plurality of optical fibers; and
a second lid covering a periphery of the other part of the plurality of optical fibers which are arranged outside the first lid, wherein
the first lid and the second lid have a water absorption property.

5. The optical fiber cable according to claim 4, wherein the other part of the plurality of optical fibers is located between the first lid and the second lid.

6. An optical fiber unit comprising:
a plurality of optical fibers;
a plurality of water-absorbent fibers; and
a coating portion covering a periphery of the plurality of optical fibers and the plurality of water-absorbent fibers, wherein
a ratio of areas of the water-absorbent fibers to an area of an accommodating portion in an inner side of the coating portion in a cross section orthogonal to a longitudinal direction of the optical fiber unit is 1% or more and 5% or less, and
a maximum value of an area of a gap portion surrounded by the optical fibers in the cross section is 1.0 mm$^2$ or less, wherein
an internal porosity obtained by dividing an internal gap area, which is obtained by subtracting areas of the plurality of optical fibers in the cross section from an area of the accommodating portion in the inner side of the sheath in the cross section, by the area of the accommodating portion is 30% or more and 50% or less, and wherein
each of the optical fibers has an outer diameter of 220 μm or less.

* * * * *